3,102,631
CONVEYOR SYSTEMS
Donald Mayer King, % Argyle Works,
Stevenage, England
Filed Dec. 22, 1960, Ser. No. 77,603
Claims priority, application Great Britain Dec. 22, 1959
1 Claim. (Cl. 198—177)

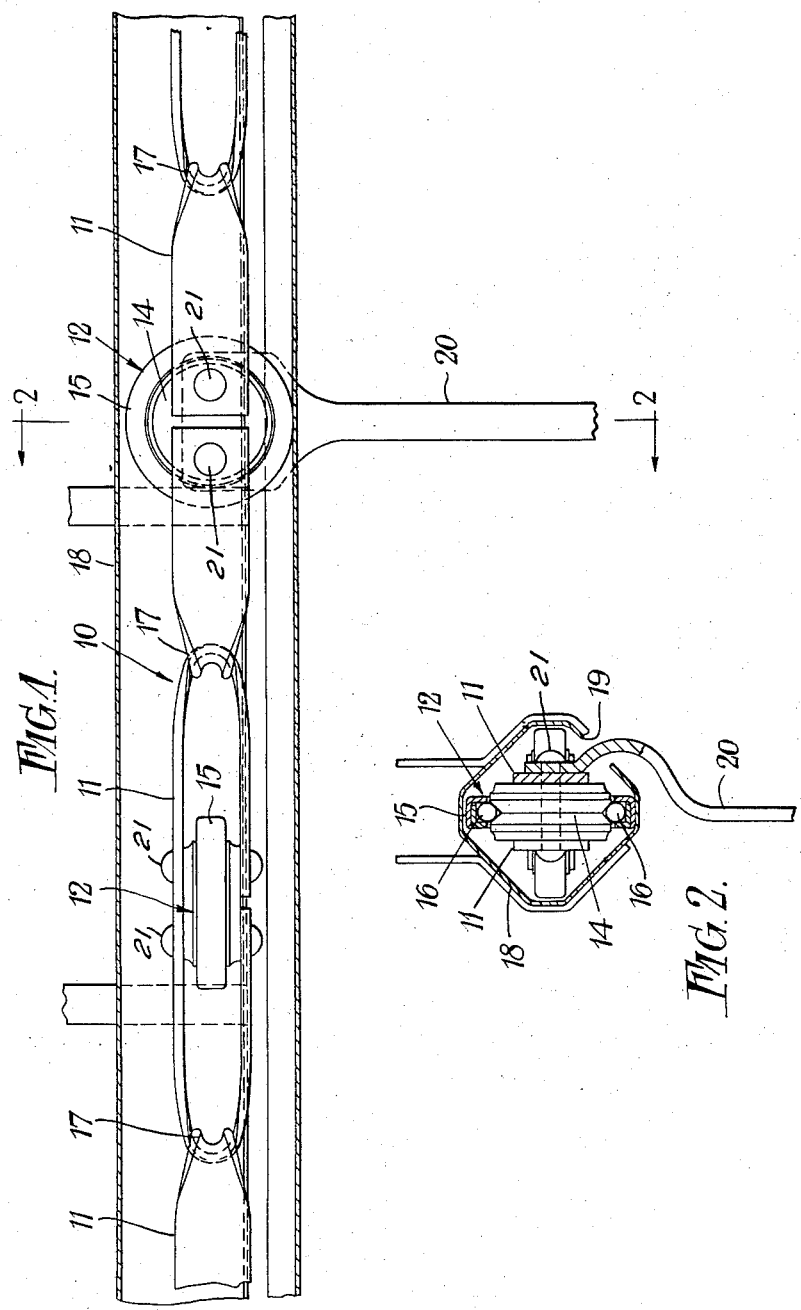

This invention relates to conveyor systems and has for its chief object to provide a conveyor which is relatively cheap to manufacture and to install, while being suitable for conveying relatively light loads.

According to the invention a conveyor will include an endless driven chain each link of which carries a single freely rotatable wheel or roller, the arrangement being such that the axis of rotation of the wheel or roller of one link will be at right angles to the axis of rotation of that or those of the immediately adjoining link or links. Preferably each link will be formed from a strip of metal bent or folded to produce a substantially closed elongated loop. Such a chain may be disposed and adapted to travel within a specially designed track which is formed from sheet metal bent or folded to produce a section approximating to octagonal.

In order that the said invention may be clearly understood and readily carried into effect reference will now be made to the accompanying drawings which show one embodiment by way of example and in which:

FIGURE 1 is a part sectional side elevational view showing a short length of a conveyor, FIGURE 2 is a section in the line 2—2 of FIGURE 1.

Referring to the drawings 10 generally denotes a conveyor chain which comprises a plurality of links 11 in each of which a single wheel or roller 12 is mounted, the arrangement being such that with the chain extending horizontally as shown the wheels or rollers of alternate links are rotatable about horizontal axes while the wheels or rollers of the intervening links are rotatable about vertical axes. In other words the axis of rotation of the wheel or roller of one link is at right angles to that or those of the immediately adjoining link or links.

As will be seen from FIGURE 1, each link is made from a strip of metal which is so folded or formed as to provide a substantially closed elongated or flattened loop the opposite ends of the strip being disposed substantially in abutment or spaced slightly from each other at one of the pair of long sides of the elongated loop. Disposed substantially centrally of the link and within the loop or area defined by the latter is a hub or boss element 14 which is adapted to support a freely rotatable annular rim element 15 adapted to constitute the wheel or roller. In known manner a ring of balls 16 is interposed between the periphery of the hub or boss element 14 and the aforesaid rim 15 so that free rotation of the latter will be assured. The thickness of the hub or boss element is such that it will fill or just fit into the space defined by the two longer sides of the links and it will be secured in position by means of two rivets, bolts or the like 21, each of which is introduced through an aperture adjacent one end of the strip 11, passes through the hub or boss element 14 and thence through an aperture in that portion of said strip which defines or constitutes the unbroken long side of the link. It will be appreciated that with the hub or boss element 14 secured in place the ends of the strip will be effectively located and the link will be rendered a completely rigid entity. It may be mentioned here that in bending the strip to form a link the substantially U shaped ends of said link are additionally folded or otherwise formed to provide a curved or rounded bearing surface as indicated at 17, the arrangement being such that an interconnection of two links the bearings surfaces at the engaged ends of the two links will cooperate with each other in such a way as to allow for substantially universal movement between said links.

It may be pointed out here that in assembling the chain successive links will of necessity require to be interconnected before the wheel or roller assemblies are inserted and secured in place. For example, the ends of the strip at one side of each link may be sprung or forced apart to allow of introduction of the adjoining link whereafter the wheel or roller assembly may then be inserted and riveted or otherwise secured in place.

It may also be pointed out that successive links will on assembly of the chain be turned through 90° about their longitudinal axes so that as indicated above the axis of rotation of the wheel or roller of one link will be at right angles to the axis of rotation of the or each immediately adjoining link.

It is proposed that a chain such as is described above will be arranged to run in a track which for example may be formed from metal sheet or strip bent or folded to a substantial octagonal section. In the drawings the track is indicated at 18 and it will be noted that in one of the walls thereof a longitudinally extending slot 19 is present, such slot allowing of the passage therethough of load bars such as that indicated at 20. As will be seen the load bars are designed to be attached to the chain, to project through said slot 19 and thereafter to depend vertically beolw the line of travel of the chain. Conveniently the load bars will be attached to the chain at any wheel assembly wherein the wheel rotates about a normally horizontal axis, the same rivets being utilised to secure the bars as are employed for securing the wheel assemblies.

I claim:

A conveyor comprising a plurality of links connected together in endwise relation in alternating perpendicular fashion to form a chain, a single roller rotatably supported in each link, the rollers in adjacent links being perpendicular to one another, a substantially closed track surrounding said chain, said track including two pairs of parallel surfaces which are mutually perpendicular to one another and two further pairs of surfaces connected to the first said surfaces to form a track of octagonal cross-section, said rollers being supported in rolling engagement between respective pairs of the first said pairs of parallel surfaces for limited movement in a direction normal to the surfaces, said track being provided with a slot in one of the surfaces of said two further pairs, extending lengthwise of the track, and means on said chain extending through said slot and into a position in alignment with the rollers associated with one of said first pairs of surfaces.

References Cited in the file of this patent
UNITED STATES PATENTS

| | | |
|---|---|---|
| 2,372,199 | Hassler | Mar. 27, 1945 |
| 2,768,733 | Wilson | Oct. 30, 1956 |

FOREIGN PATENTS

| | | |
|---|---|---|
| 738,491 | Germany | Aug. 18, 1943 |
| 572,604 | Great Britain | July 17, 1944 |